U. H. BROWN.
AXLE SKEIN.
APPLICATION FILED MAR. 15, 1909.
923,135.
Patented June 1, 1909.
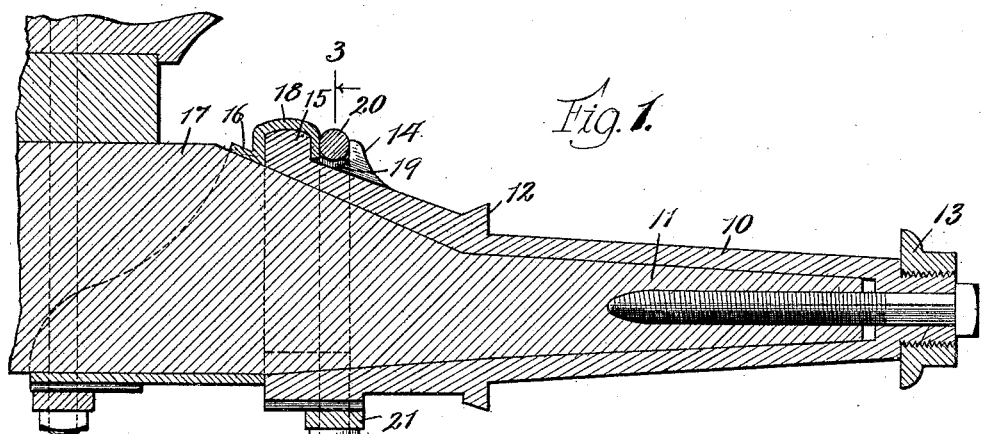
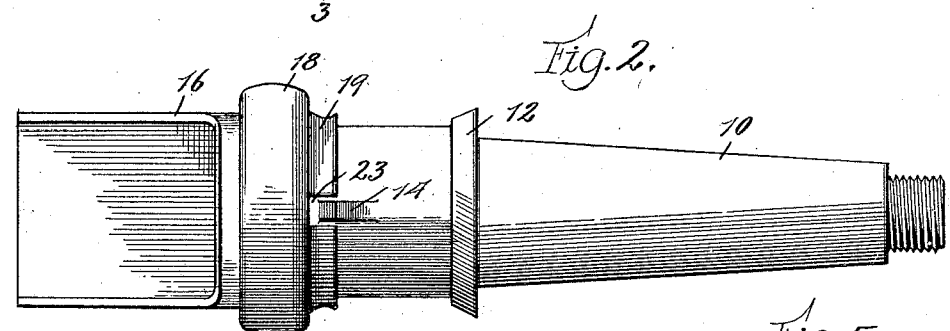
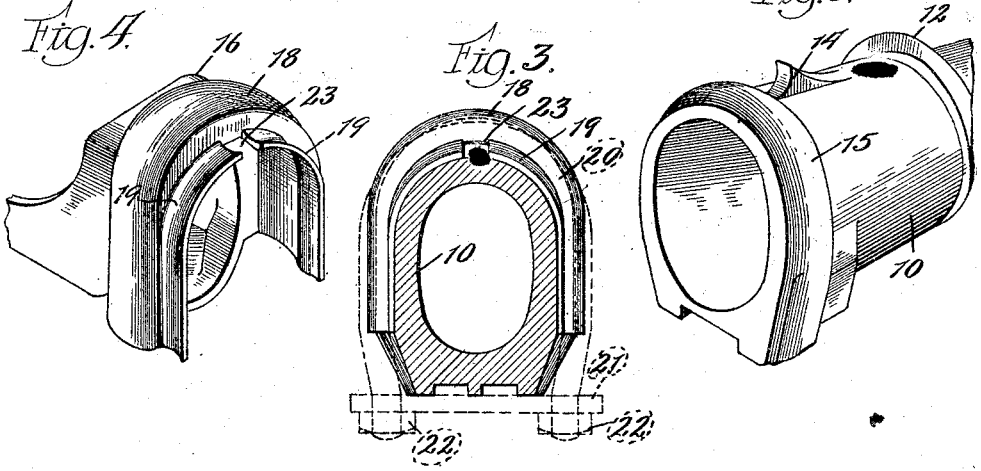
Witnesses:
Inventor:
Uri H. Brown.

UNITED STATES PATENT OFFICE.

URI H. BROWN, OF ZANESVILLE, OHIO, ASSIGNOR TO THE BROWN MANUFACTURING COMPANY, OF ZANESVILLE, OHIO, A CORPORATION OF OHIO.

AXLE-SKEIN.

No. 923,135.　　　　Specification of Letters Patent.　　　　Patented June 1, 1909.

Application filed March 15, 1909.　Serial No. 483,496.

*To all whom it may concern:*

Be it known that I, URI H. BROWN, a citizen of the United States, residing at Zanesville, in the county of Muskingum and State of Ohio, have invented certain new and useful Improvements in Axle-Skeins, of which the following is a specification, reference being had to the accompanying drawings.

My invention relates to that type of axle-skeins wherein the two principal parts, viz. the wearing portion and the attaching portion, are separately formed and united together. It is of very considerable advantage to so construct an axle-skein for the reason that it is thereby possible to make the two parts of different materials, as, for example, cast-iron for the wearing portion and malleable iron for the other portion.

The object of my invention is to provide an improved construction that will enable these two principal parts to be readily and firmly united. I accomplish this object as illustrated in the drawings and as hereinafter particularly described.

That which I believe to be new will be set forth in the claims.

In the drawings,—Figure 1 is a longitudinal central section through my improved device, showing the same applied in position on an axle; Fig. 2 is a plan view of the device, the U-shaped clip for holding the two principal parts of the device locked together when on an axle being omitted; Fig. 3 is a cross-section taken at line 3—3 of Fig. 1, the holding-clip being indicated in dotted lines; Fig. 4 is a perspective view of the inner or attaching member of the device; and Fig. 5 is a similar view of the outer or wearing member—a portion being broken away in each of said Figs. 4 and 5.

Referring to the several figures of the drawings, in which corresponding parts are indicated by like reference characters,—10 indicates the outer member of the device, the same being the wearing portion upon which the hub of a wheel will be journaled, the same fitting upon the spindle portion of an ordinary vehicle-axle 11, as shown in Fig. 1. This member 10 is provided with an annular shoulder 12, against which the inner face of a hub will bear, the hub being retained on the axle by a nut 13, as usual. Near the inner end of this member 10 and on the top surface thereof is provided a lug or projection 14, the end face of which, as clearly shown in Fig. 5, is curved—the object of which will hereinafter appear. The outer surface of the member 10 at its extreme inner end is provided with a heavy bead 15. The annular shoulder 12, the lug or projection 14 and the bead 15 are, as shown, integral with the member 10—such member 10 being best formed by casting, as cast-metal is found to be the best material from which to form the wearing portion of the device, viz. that portion upon which the wheel-hub turns.

16 indicates the other principal member of the device, of socket form to fit upon the body-portion 17 of the axle. The outer end of this member 16 is substantially in the shape of an inverted U and near its said outer end it is provided with a heavy rib whose inner surface is fashioned to provide a wide channel or groove of a size and shape to adapt it to receive and hold the heavy bead 15 formed on the exterior surface of the member 10. By reason of the U-shape of the outer end of this member 16, such member 16 is adapted to be readily connected to the member 10 so that the said groove and bead will interlock, as will be readily understood. Just forward of this rib 18 is formed a flange 19, of substantially the same U-shape of said channeled or grooved rib 18, the outer face of said flange being slightly concaved, as shown, the better to adapt it to receive a stirrup 20. The ends of this stirrup pass through a cross-plate 21, which will be held forced tightly against the flattened under face of the member 10 by nuts 22 screwed on the ends of such stirrup, as usual. As shown, the central part of the flange 19 is provided with an opening 23 of a size and shape to adapt the stud or projection to pass through it when the two members are united in the manner just described. As shown, the curved inner end of the stud or projection extends into this opening and its curvature corresponds to the curved rod of which the stirrup 20 is formed. By means of this stud or projection the stirrup is insured being held in proper position on the flange, even if by reason of one or both of the nuts 22 becoming a little loosened the stirrup should not be tightly pressed to its seat on the flange 19.

By my construction I am able to provide an axle-skein of two members, whereby the outer member may be constructed of cast-metal as is desirable for wearing purposes, while the other member may advantageously be made of wrought or malleable metal for the best results, and at the same time so provide for connecting these members together on an axle that the union will be a strong and simple one.

That which I claim as my invention, and desire to secure by Letters Patent, is,—

1. In an axle-skein, the combination of two members, one of said members having a bead on its outer surface at one end and the other member having a substantially U-shaped end-portion provided with a channel or groove on the inner face thereof adapted to receive and hold the bead on said other member, and means for locking said members together.

2. In an axle-skein, the combination of two members, one of said members having a bead on its outer surface at one end and the other member being provided with a substantially U-shaped end-portion having a channel or groove on the inner face thereof adapted to receive and hold the bead on said other member and also provided with a flange, a stirrup supported on said flange, and means for securing said stirrup in place.

3. In an axle-skein, the combination of two members, one of said members having a bead on its outer surface at one end and a lug or projection adjacent to said bead, and the other member having a substantially U-shaped end-portion provided with a channel or groove on the inner face thereof adapted to receive and hold the bead on said other member and also having a flange, a stirrup supported on said flange and held against removal therefrom by said lug or projection, and means for locking said stirrup in place.

URI H. BROWN.

Witnesses:
J. B. FORD,
W. B. BROWN.